(12) United States Patent
Sadowski

(10) Patent No.: US 11,216,052 B2
(45) Date of Patent: Jan. 4, 2022

(54) MODIFYING AN OPERATING STATE OF A PROCESSING UNIT BASED ON WAITING STATUSES OF BLOCKS

(71) Applicant: ADVANCED MICRO DEVICES, INC., Santa Clara, CA (US)

(72) Inventor: Greg Sadowski, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 55 days.

(21) Appl. No.: 16/146,950

(22) Filed: Sep. 28, 2018

(65) Prior Publication Data

US 2020/0103953 A1 Apr. 2, 2020

(51) Int. Cl.

| | | |
|---|---|---|
| G06F 1/32 | (2019.01) | |
| G06F 1/3228 | (2019.01) | |
| G06F 1/3296 | (2019.01) | |
| G06F 11/34 | (2006.01) | |
| G06N 20/00 | (2019.01) | |

(52) U.S. Cl.
CPC .......... *G06F 1/3228* (2013.01); *G06F 1/3296* (2013.01); *G06F 11/3466* (2013.01); *G06N 20/00* (2019.01)

(58) Field of Classification Search
CPC ..................................... G06F 1/32; G06F 9/44
See application file for complete search history.

(56) References Cited

U.S. PATENT DOCUMENTS

| | | | | |
|---|---|---|---|---|
| 2004/0001301 A1* | 1/2004 | Okitsu | ...................... | H02P 7/29 361/160 |
| 2009/0153537 A1* | 6/2009 | Tada | ........................ | G09G 3/30 345/212 |
| 2014/0129784 A1* | 5/2014 | Chapman | ................ | G06F 9/542 711/154 |
| 2014/0359331 A1* | 12/2014 | Kuan | ...................... | G06F 1/263 713/323 |
| 2015/0378419 A1* | 12/2015 | Berghe | .................. | G06F 1/3206 713/320 |
| 2016/0147277 A1* | 5/2016 | Park | ........................ | G06F 1/206 713/322 |

* cited by examiner

Primary Examiner — Keshab R Pandey

(57) ABSTRACT

A processing unit includes a plurality of components configured to execute instructions and a controller. The controller is configured to determine a power consumption of the processing unit, determine a waiting status of the processing unit based on waiting statuses of components, and selectively modify an operating state of the processing unit based on the waiting status and the power consumption of the processing unit. In some cases, the operating state is modified in response to a percentage of the components that are waiting for an action to complete being below a threshold percentage and the power consumption of the processing unit being below a power limit. In some cases, the controller identifies a pattern in the power consumption by the processing unit and modifies the operating state of the processing unit to increase the power consumption of the processing unit based on the pattern identified by the controller.

20 Claims, 6 Drawing Sheets

MODIFYING AN OPERATING STATE OF A PROCESSING UNIT BASED ON WAITING STATUSES OF BLOCKS

BACKGROUND

Processing units such as a graphics processing unit (GPU) or a central processing unit (CPU) typically implement multiple processing elements (referred to as compute units in the case of the GPU and processor cores in the case of a CPU) that execute instructions concurrently or in parallel. For example, the compute units in a GPU execute a kernel as multiple threads executing the same instructions on different data sets. The instructions in the kernel represent shaders that perform graphics processing, neural networks that perform machine learning tasks, and the like. A processing unit also includes a command processor that fetches commands from command buffers, allocates resources, and schedules the commands for execution on one or more of the processing elements in the processing unit. Workloads executing on the processing elements are frequently required to pause execution and wait for other commands, such as memory access requests, to complete before the processing element resumes execution. Some applications require the resources of more than one processing unit. For example, machine learning applications that are implemented using neural networks can be implemented using several GPUs operating in parallel. The GPUs communicate with each other by sending data to buffers on other GPUs and then signaling the other GPU to announce that the data is available in the buffer. The originating GPU is required to wait for the receiving GPU to acknowledge receipt of the data, e.g., after completing any processing that was underway before the receiving GPU received the announcement.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
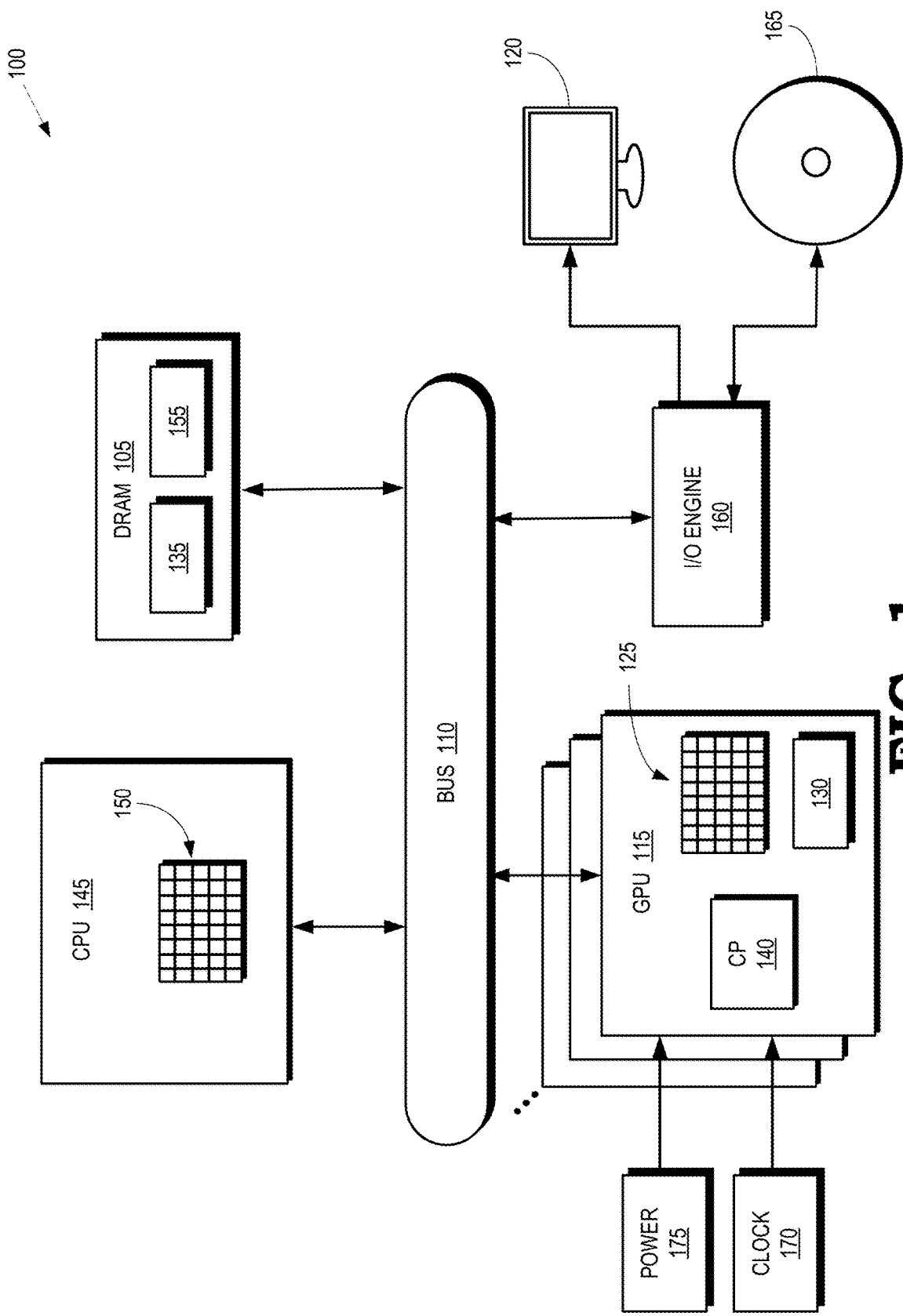
FIG. 1 is a block diagram of a processing system in accordance with some embodiments.

Kernels that are executing on a GPU (or other processing unit) are not necessarily optimized to consume the available hardware resources of the GPU. For example, neural network layers in a machine learning application are represented by kernels that are executed by the compute units of the GPU. Kernels that are well optimized consume the available hardware resources, e.g., a compute unit executing a thread of a well optimized kernel typically operates near the power limit for the compute unit. However, kernels that are not (or cannot be) well optimized do not consume the available hardware resources and operate below the power limit, which means that the GPU is wasting some available power. In some cases, a clock frequency of the GPU is reduced in response to the lower activity indicated by the low power consumption of less than optimal kernels, which increases the duration of the inefficient kernel execution. In other cases, the clock frequency of the GPU is maintained at a relatively high frequency while the kernel is waiting to resume execution, e.g., while waiting for a memory access request to complete or waiting for an acknowledgment of inter-GPU communication. Running the GPU at a high frequency while the compute units are waiting wastes power and unnecessarily heats up the GPU without improving performance or reducing the waiting time for the compute units.

FIGS. 1-6 disclose techniques for increasing the speed and efficiency of applications executing on a processing unit such as a GPU by selectively modifying an operating state of the processing unit based on a waiting status of the processing unit and a power consumption of the processing unit. The waiting status of the processing unit is determined by a weighted combination of the waiting statuses of the components of the processing unit, which include processing elements, processor cores of a CPU, compute units of a GPU, command processors, and the like. For example, the waiting status can be indicated as a percentage of the components that are waiting for an action to complete, such as a memory access request or inter-GPU communication. In some embodiments, selectively modifying the operating state of the processing unit includes increasing at least one of a clock frequency and a voltage supplied to the processing unit in response to a percentage of the components of the processing unit that are waiting being below a threshold and the power consumption of the processing unit being below a power limit. A magnitude of the increase in the clock frequency or the voltage is determined based on a difference between the power consumption of the processing unit and the power limit.

Some embodiments of the processing unit identify patterns in the power consumption of the processing unit and selectively modify the operating state of the processing unit based on the detected patterns. For example, machine learning applications executing on a GPU typically operate in a periodic manner. The GPU is therefore able to learn patterns of time intervals during which the power consumption is below the power limit. The operating state of the processing unit is then modified to increase the power consumption during the time intervals indicated by the pattern. Some applications, such as a neural network configured to perform machine learning, require the resources of multiple GPUs. In that case, the operating state of a system that includes multiple GPUs can be modified based on a waiting status and a power consumption of the system.

FIG. 1 is a block diagram of a processing device 100 in accordance with some embodiments. The processing system 100 includes or has access to a memory 105 or other storage component that is implemented using a non-transitory computer readable medium such as a dynamic random access memory (DRAM). However, the memory 105 can also be implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes one or more graphics processing units (GPUs) 115 that are configured to render images for presentation on a display 120. For example, the GPU 115 can render objects to produce values of pixels that are provided to the display 120, which uses the pixel values to display an image that represents the rendered objects. Some embodiments of the GPU 115 can also be used for general purpose computing. For example, the GPU 115 can be used to implement machine learning algorithms such as neural networks. In some cases, operation of multiple GPUs 115 are coordinated to execute the machine learning algorithm, e.g., if a single GPU 115 does not possess enough processing power to run the machine learning algorithm on its own. The multiple GPUs 115 communicate using inter-GPU communication over one or more interfaces (not shown in FIG. 1 in the interest of clarity).

The GPU 115 implements multiple processing elements (also referred to as compute units) 125 that are configured to execute instructions concurrently or in parallel. The GPU 115 also includes an internal (or on-chip) memory 130 that includes a local data store (LDS), as well as caches, registers, or buffers utilized by the processing elements 125. The internal memory 130 stores data structures that describe tasks executing on one or more of the processing elements 125. In the illustrated embodiment, the GPU 115 communicates with the memory 105 over the bus 110. However, some embodiments of the GPU 115 communicate with the memory 105 over a direct connection or via other buses, bridges, switches, routers, and the like. The GPU 115 can execute instructions stored in the memory 105 and the GPU 115 can store information in the memory 105 such as the results of the executed instructions. For example, the memory 105 can store a copy 135 of instructions from a program code that is to be executed by the GPU 115 such as program code that represents a machine learning algorithm or neural network. The GPU 115 also includes a coprocessor 140 that receives task requests and dispatches tasks to one or more of the processing elements 125.

The processing system 100 also includes a central processing unit (CPU) 145 that is connected to the bus 110 and communicates with the GPU 115 and the memory 105 via the bus 110. In the illustrated embodiment, the CPU 145 implements multiple processing elements (also referred to as processor cores) 150 that are configured to execute instructions concurrently or in parallel. The CPU 145 can execute instructions such as program code 155 stored in the memory 105 and the CPU 145 can store information in the memory 105 such as the results of the executed instructions. The CPU 145 is also able to initiate graphics processing by issuing draw calls to the GPU 115.

An input/output (I/O) engine 160 handles input or output operations associated with the display 120, as well as other elements of the processing system 100 such as keyboards, mice, printers, external disks, and the like. The I/O engine 160 is coupled to the bus 110 so that the I/O engine 150 communicates with the memory 105, the GPU 115, or the CPU 145. In the illustrated embodiment, the I/O engine 160 is configured to read information stored on an external storage component 165, which is implemented using a non-transitory computer readable medium such as a compact disk (CD), a digital video disc (DVD), and the like. The I/O engine 160 can also write information to the external storage component 165, such as the results of processing by the GPU 115 or the CPU 145.

In operation, the CPU 145 issues commands or instructions (which are sometimes referred to herein as "draw calls") to the GPU 115 to initiate processing of a kernel that represents the program instructions that are executed by the GPU 115. Multiple instances of the kernel, referred to herein as threads or work items, are executed concurrently or in parallel using subsets of the processing elements 125. In some embodiments, the threads execute according to single-instruction-multiple-data (SIMD) protocols so that each thread executes the same instruction on different data. The threads are collected into workgroups that are executed on different processing elements 125. For example, the command processor 140 can receive the draw calls and schedule tasks for execution on the processing elements 125.

An operating state of the GPU 115 is determined by parameters such as a frequency of a clock signal that is supplied to the GPU 115 (or components or domains within the GPU 115) by a clock 170, a voltage that is supplied to the GPU 115 (or components or domains within the GPU 115) by a power supply 175, and the like. The GPU 115 is also associated with a power limit that determines the maximum amount of power that should be supplied to the GPU 115. The power limit is determined based on considerations such as limits on the current drawn by the GPU 115, a thermal capacity of the GPU 115, cooling or heatsinks available near the GPU 115, and the like. In some circumstances, the GPU 115 consumes power at a rate that is lower than the power limit, e.g., during time intervals of relatively low activity for some or all of the compute units 125 in the GPU 115. The difference between the power consumption and the power limit is therefore available to enhance performance of the GPU 115 by modifying the operating state, e.g., by increasing the clock frequency or increasing the voltage supplied to the GPU 115. For example, a machine learning algorithm that is executing on the GPU 115 can be accelerated by increasing the clock frequency or voltage supplied to the GPU 115.

Boosting the operating state of the GPU 115 does not always improve the performance of the GPU 115. Components of the GPU 115 and the CPU 145, such as the compute units 125, the command processor 140, and the processor cores 150, enter waiting states when they are required to wait for another action to complete before the component can proceed. For example, a compute unit 125 executing an instruction that uses an operand may have to wait for completion of a memory access request that is used to retrieve the operand from memory or wait for completion of another instruction that generates the operand. Boosting the clock frequency or the voltage supplied to the GPU 115 while a large percentage of the compute units 125 are in a waiting state increases the power consumption of the GPU 115 but does not contribute to reducing the duration of the waiting state. Boosting the clock frequency or the voltage in that circumstance therefore leads to a degradation in the performance/watt of the GPU 115.

At least in part to address this drawback in the conventional practice, the GPU 115 (or control circuitry associated with the GPU 115) determines a power consumption and a waiting status of the GPU 115. The waiting status is determined based on the waiting statuses of the compute units 125. In some embodiments, the waiting status of the GPU 115 is set equal to a percentage of the compute units 125 that are waiting for an action to complete before resuming execution. The operating state of the GPU 115 is then selectively modified based on the waiting status and the power consumption of the GPU 115. In some embodiments, the clock frequency or the voltage supplied to the GPU 115 is increased in response to the waiting status of the GPU 115 being larger than a threshold percentage, such as 50%. The magnitude of the modification of the clock frequency or the voltage is determined based on the difference between the measured power consumption and the power limit of the GPU 115. A larger value of the difference leads to a larger increase in the clock frequency or the voltage and a smaller value of the difference leads to a smaller increase in the clock frequency or the voltage.

Although the selected modification of the operating state is disclosed herein in the context of modifications to the operating state of a processing unit such as the GPU 115 or the CPU 145, some embodiments of the techniques disclosed herein are used to modify operating states of multiple GPUs 115 that are used to implement applications such as machine learning algorithms. In that case, a waiting status and a power limit associated with the group of GPUs 115 is used to determine whether to modify the operating states of one or more of the GPUs 115 and, if so, the magnitude of the changes.

Figure 2:
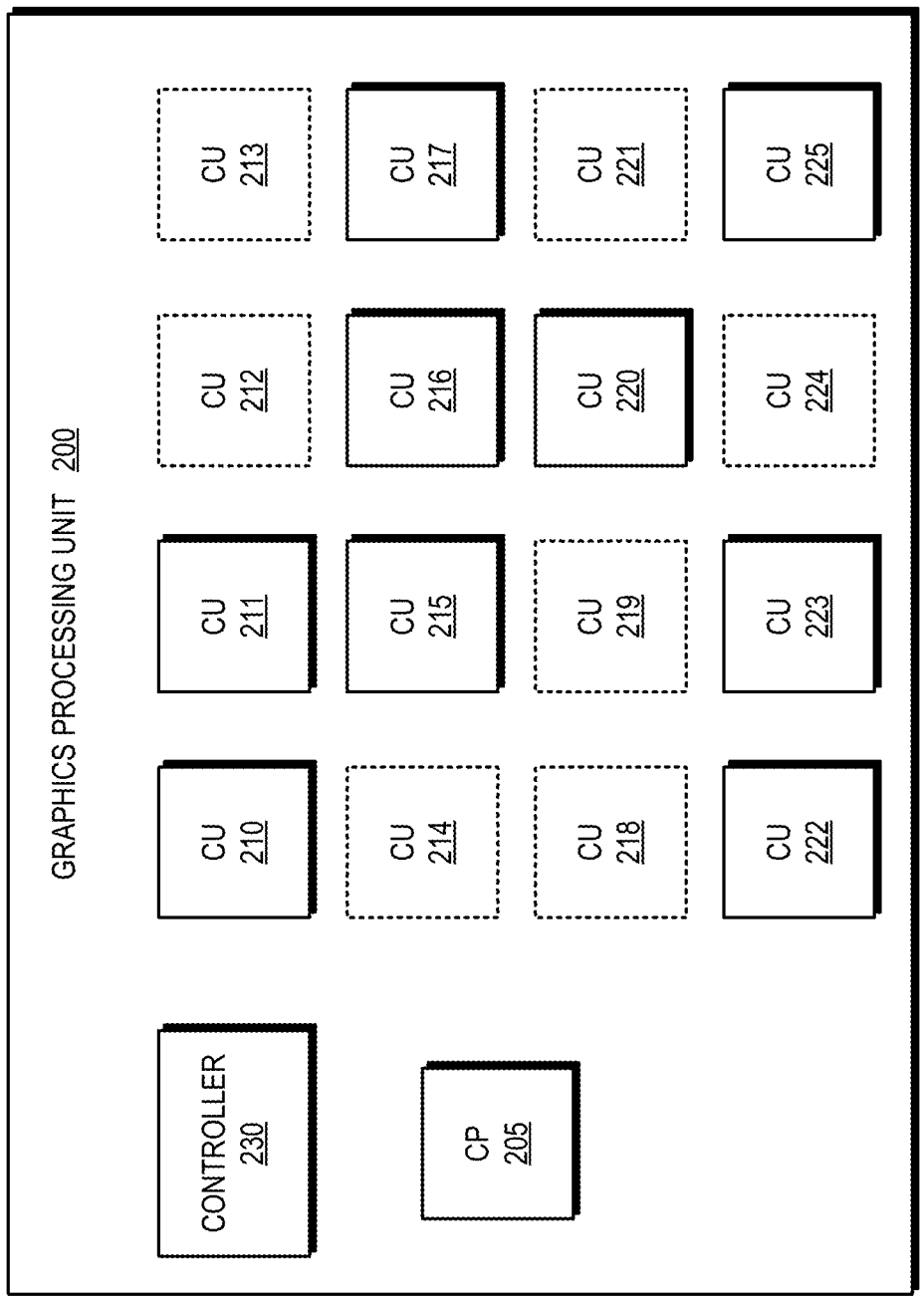
FIG. 2 is a block diagram of a graphics processing unit (GPU) according to some embodiments.

FIG. 2 is a block diagram of a graphics processing unit (GPU) 200 according to some embodiments. The GPU 200 is used to implement some embodiments of the GPUs 115 shown in FIG. 1. The GPU 200 includes a command processor 205 that receives instructions to execute commands such as instructions represented by a kernel provided to the GPU 200. The command processor 205 schedules and dispatches instructions for execution on one or more of the compute units 210, 211, 212, 213, 214, 215, 216, 217, 218, 219, 220, 221, 222, 223, 224, 225, which are collectively referred to herein as "the compute units 210-225."

The GPU 200 also includes a controller 230 that monitors conditions within the GPU 200 and configures the GPU 200 based on the monitored conditions. Although the controller 230 is depicted as an integral part of the GPU 200, some embodiments of the controller 230 are external to the GPU 200 and communicate with the GPU 200 over a corresponding interface. The controller 230 monitors a waiting status of the GPU 200. In some embodiments, the waiting status of the GPU 200 is determined based on the waiting statuses of the compute units 210-225 and the command processor 205. For example, the waiting status of the GPU 200 can be represented as a percentage of the compute units 210-225 that are waiting for another action to complete before proceeding with execution. In the illustrated embodiment, the compute units 210, 211, 215, 216, 217, 220, 222, 223, 225 are actively processing instructions and the compute units 212, 213, 214, 218, 219, 221, 224 are waiting for another action to complete, as indicated by the dashed boxes. The waiting status of the GPU 200 is therefore equal to 44%.

The controller 230 also monitors power consumption in the GPU 200. Some embodiments of the controller 230 monitor the total power consumption of the GPU 200 as a function of time, as well as monitoring power consumption by individual compute units 210-225. The controller 230 stores or has access to information indicating a power limit for the GPU 200. The controller 230 uses the power limit and the measured power consumption to determine an available power, which is equal to a difference between the power limit and the measured power consumption for the GPU 200.

Some embodiments of the compute units 210-225 implement circuits that calculate the corresponding waiting status for different types of waiting, e.g., waiting for a memory access request, waiting for an inter-GPU communication, waiting for another instruction to generate a value of an operand, and the like. The waiting status components are transmitted from the compute units 210-225 to the controller 230, which decides whether to modify an operating state of the GPU 200. The controller 230 makes the decision based on characteristics including overall activity, the waiting status, the available extra power, restrictions on the current drawn by the GPU 200, and other factors. Some embodiments of the controller 230 reschedule kernels or threads to different compute units 210-225 to consolidate the workload on to a subset of the compute units 210-225. For example, if an activity level of the compute units 210, 211, 215 is relatively low, threads scheduled to the compute units 210, 211, 215 are rescheduled to consolidate the threads onto the compute units 216, 217, 220, 222, 223, 225.

Figure 3:
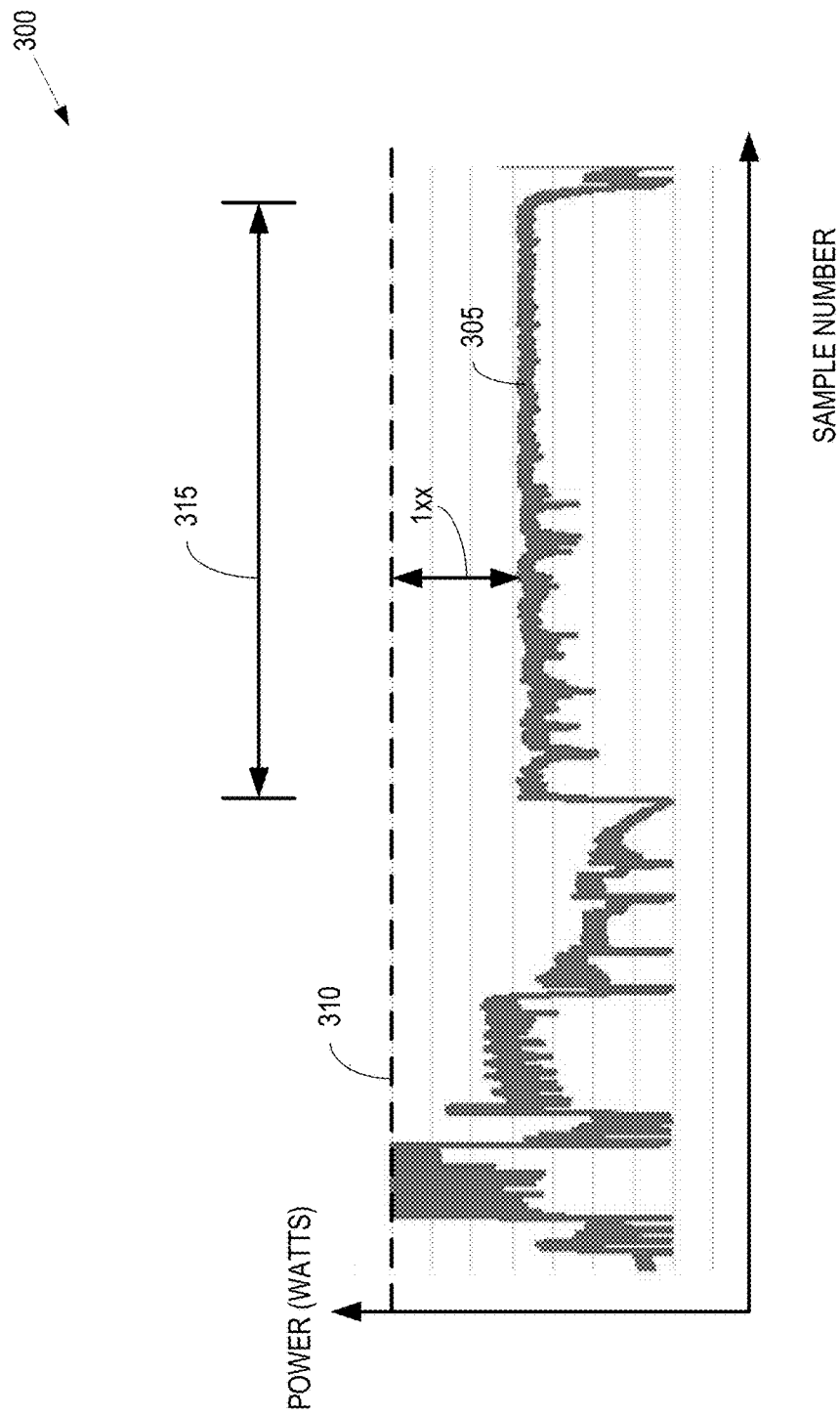
FIG. 3 is a plot that illustrates power consumption of a processing unit such as a GPU according to some embodiments.

FIG. 3 is a plot 300 that illustrates power consumption 305 of a processing unit such as a GPU according to some embodiments. The vertical axis of the plot 300 indicates the power consumption (in watts) and the horizontal axis of the plot 300 indicates a number of the sample corresponding to the measured power consumption 305. In some embodiments, the power consumption 305 is measured by a controller such as the controller 230 shown in FIG. 2. A power limit 310 for the GPU is also shown in FIG. 3.

The power consumption 305 varies depending on the instructions or kernels that are being executed on the GPU. For example, the power consumption 305 is at the power limit 310 in the range of samples from approximately a sample number of 1000 to a sample number of 3000. For another example, the power consumption 305 remains below the power limit 310 for the time interval 315, which corresponds to sample numbers ranging from approximately 11,000 to approximately 26,000. The difference 320 between the measured power consumption 305 and the power limit 310 during the time interval 315 is caused by circumstances such as a large number of compute units in the GPU being in a waiting state, the kernel executing on the GPU not being optimized to consume the available hardware resources of the GPU, or a combination thereof. For example, machine learning applications execute a sequence of kernels that represent neural network layers. Some of the kernels of the machine learning application are well optimized to consume hardware resources and operate near the power limit 310. Other kernels of the machine learning application may not (or cannot) the optimized and therefore don't utilize all of the available hardware resources, which results in a power consumption 305 that is below the power limit 310. The difference 320 represents power that is available to boost performance of the GPU, as discussed in detail herein.

Figure 4:
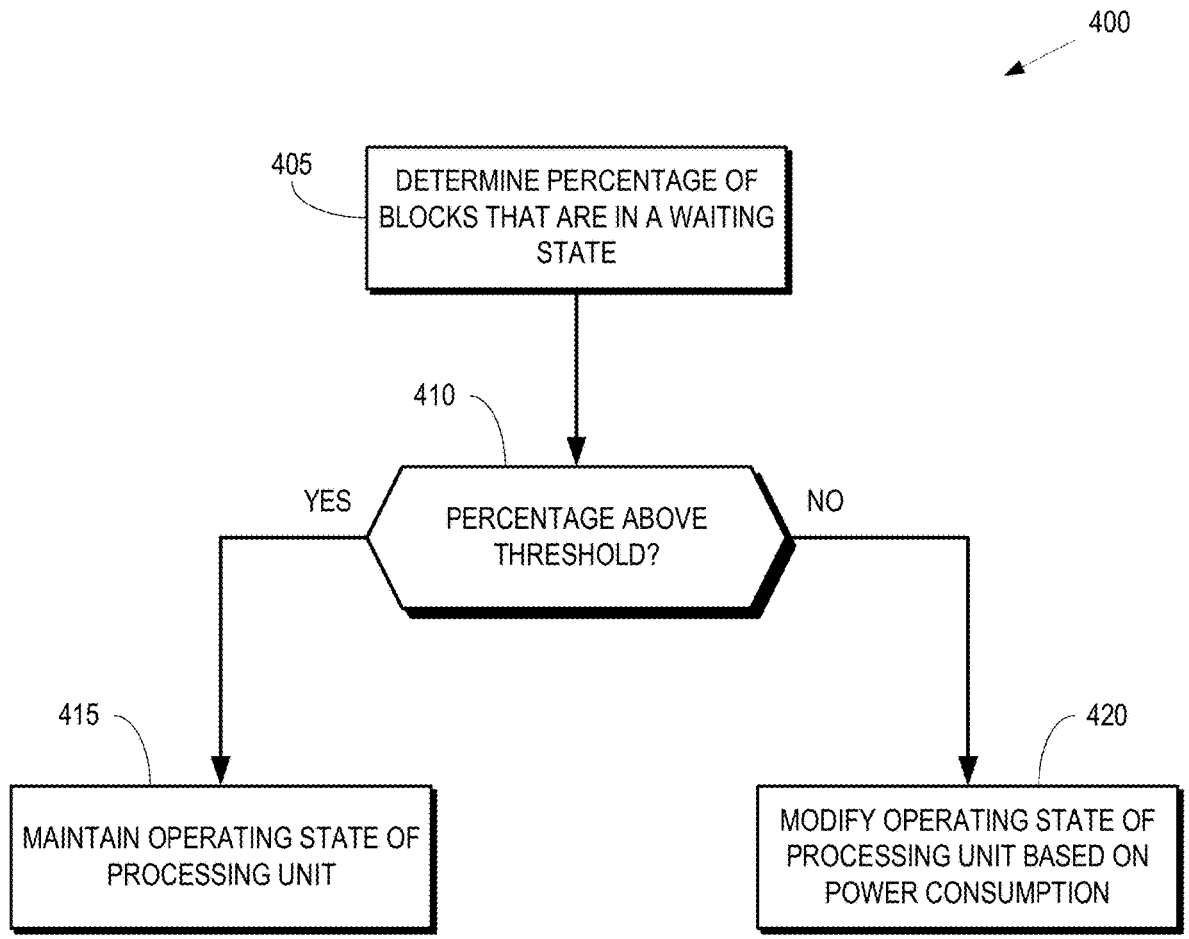
FIG. 4 is a flow diagram of a method of dynamically modifying an operating state of a processing unit to boost performance during low activity intervals according to some embodiments.

FIG. 4 is a flow diagram of a method 400 of dynamically modifying an operating state of a processing unit to boost performance during low activity intervals according to some embodiments. The method 400 is implemented in some embodiments of the processing system 100 shown in FIG. 1 and the GPU 200 shown in FIG. 2. The method 400 is implemented in a controller such as the controller 230 shown in FIG. 2.

At block 405, the controller determines a percentage of blocks that are in a waiting state. For example, the controller determines a number of compute units in a GPU that are waiting for an action (such as a memory access request or other instruction) to complete. The controller determines a waiting status for the processing unit that is equal to a percentage of the blocks that are waiting for the action to complete. The percentage of the blocks that are waiting for the action to complete indicates whether modifying the operating state of the processing unit is likely to produce a performance boost. For example, if the percentage of blocks in the waiting state is above 70%, increasing a clock frequency or a voltage supplied to the processing unit is unlikely to reduce the duration of the waiting state. For another example, if the percentage of blocks in the waiting state is below 20%, increasing the clock frequency or the voltage supplied to the processing unit is likely to reduce the duration of the waiting state because the low activity is likely due to unoptimized or poorly optimized kernels executing on the processing unit. For yet another example, if the percentage of blocks in the waiting state is approximately 50%, the controller may use additional information that characterizes the circuit to determine whether modifying the operating state of the processing unit is likely to produce a performance boost.

At decision block 410, the controller determines if the percentage of blocks that are in a waiting state is above a threshold percentage. If so, modifying the operating state of the processing unit is unlikely to provide a performance boost and the method 400 flows to block 415. If not, modifying the operating state of the processing unit is likely to provide a performance boost and the method 400 flows to block 420.

At block 415, the controller maintains the operating state of the processing unit, e.g., by maintaining a clock frequency or voltage supplied to the processing unit. At block 420, the controller modifies the operating state of the processing unit based on a measured power consumption of the processing unit. Some embodiments of the controller compare the measured power consumption to a power limit for the processing unit and determine a magnitude of the change in the operating state based on the difference between the measured power consumption and the power limit. For example, the magnitude of a change in a clock frequency or voltage supplied to the processing unit is determined based on the difference. Larger differences between the measured power consumption in the power limit indicate more available power and larger potential increases in the clock frequency or the voltage. Smaller differences indicate less available power and smaller potential increases in the clock frequency or the voltage. At a subsequent time, the controller can return the operating state of the processing unit to its original state, e.g., by reducing the clock frequency or the voltage supplied to the processing unit if the number of blocks that are in a waiting state rises above the threshold or the measured power consumption increases to or above the power limit.

Figure 5:
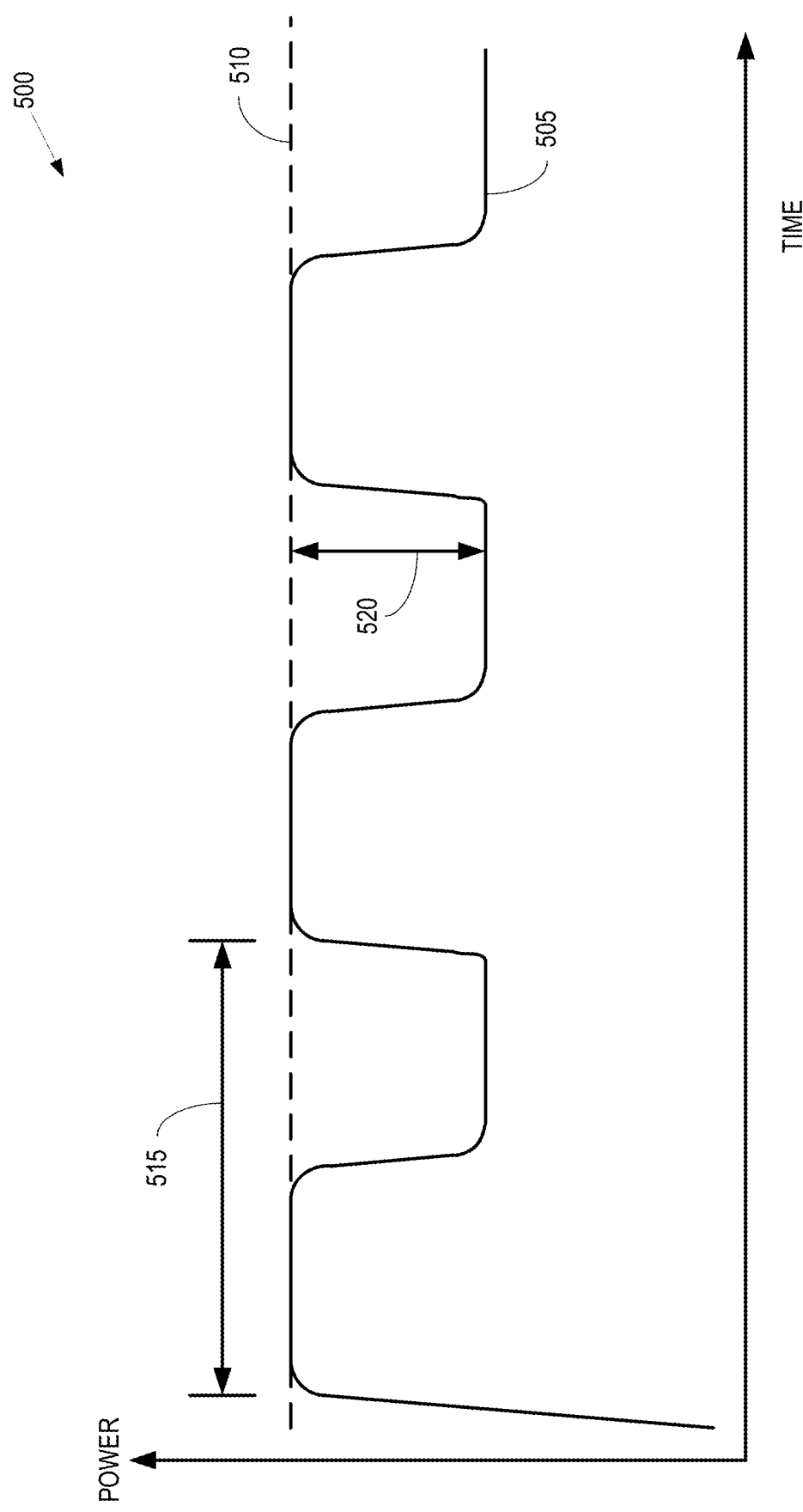
FIG. 5 is a plot that illustrates a pattern of power consumption of a processing unit such as a GPU according to some embodiments.

FIG. 5 is a plot 500 that illustrates a pattern of power consumption 505 of a processing unit such as a GPU according to some embodiments. The vertical axis of the plot 500 indicates the power consumption (in watts) and the horizontal axis of the plot 500 indicates time increasing from left to right. In some embodiments, the power consumption 505 is measured by a controller such as the controller 230 shown in FIG. 2. A power limit 510 for the GPU is also shown in FIG. 3. The pattern is produced by characteristics of the kernel (or kernels) executing on the processing unit. For example, a machine learning algorithm typically cycles through training phases and pattern recognition phases, which creates corresponding cycles in the power consumption and waiting statuses of the processing elements of the processing unit.

The power consumption 505 fluctuates according to a pattern that repeats over the time interval 515. The pattern includes a first portion during which the processing unit is optimized to consume the available hardware resources and operate at or near the power limit 510. The pattern also includes a second portion during which the processing unit is not optimized to consume the available hardware resources and therefore operates below the power limit 510. In the illustrated embodiment, the processing unit consumes power at a level that is below the power limit 510 by a difference 520. Although the pattern of the power consumption 505 cycles between high and low power consumption states once during the time interval 515, other patterns are also possible.

In some embodiments, the controller implements a machine learning algorithm that identifies the pattern in the power consumption 505 by monitoring the power consumption 505 over time. The controller also identifies patterns in the waiting status of the processing unit. The patterns indicate situations that are and are not likely to provide a performance boost in response to boosting the operating state of the processing unit. For example, time intervals characterized by power consumption 505 below the power limit 510 and relatively low percentages of compute units in the waiting state are good candidates for boosting the operating state by increasing the clock frequency or voltage. For another example, time intervals characterized by power consumption 505 at or near the power limit 510, or by relatively high percentages of compute units in the waiting state, are not good candidates for boosting the operating state of the processing unit.

The controller selectively modifies an operating state of the processing unit based on the pattern. For example, the controller increases a clock frequency or a voltage supplied to the processing unit during the second portions of the pattern if the waiting status of the processing unit indicates that a relatively low percentage of compute units are waiting for other actions to complete. In that situation, boosting the operating state of the processing unit is likely to provide a performance boost, as discussed herein. The controller also returns the operating state to its initial state in response to the pattern transitioning from the second, low power consumption portion back to the first, high power consumption portion of the pattern.

Figure 6:
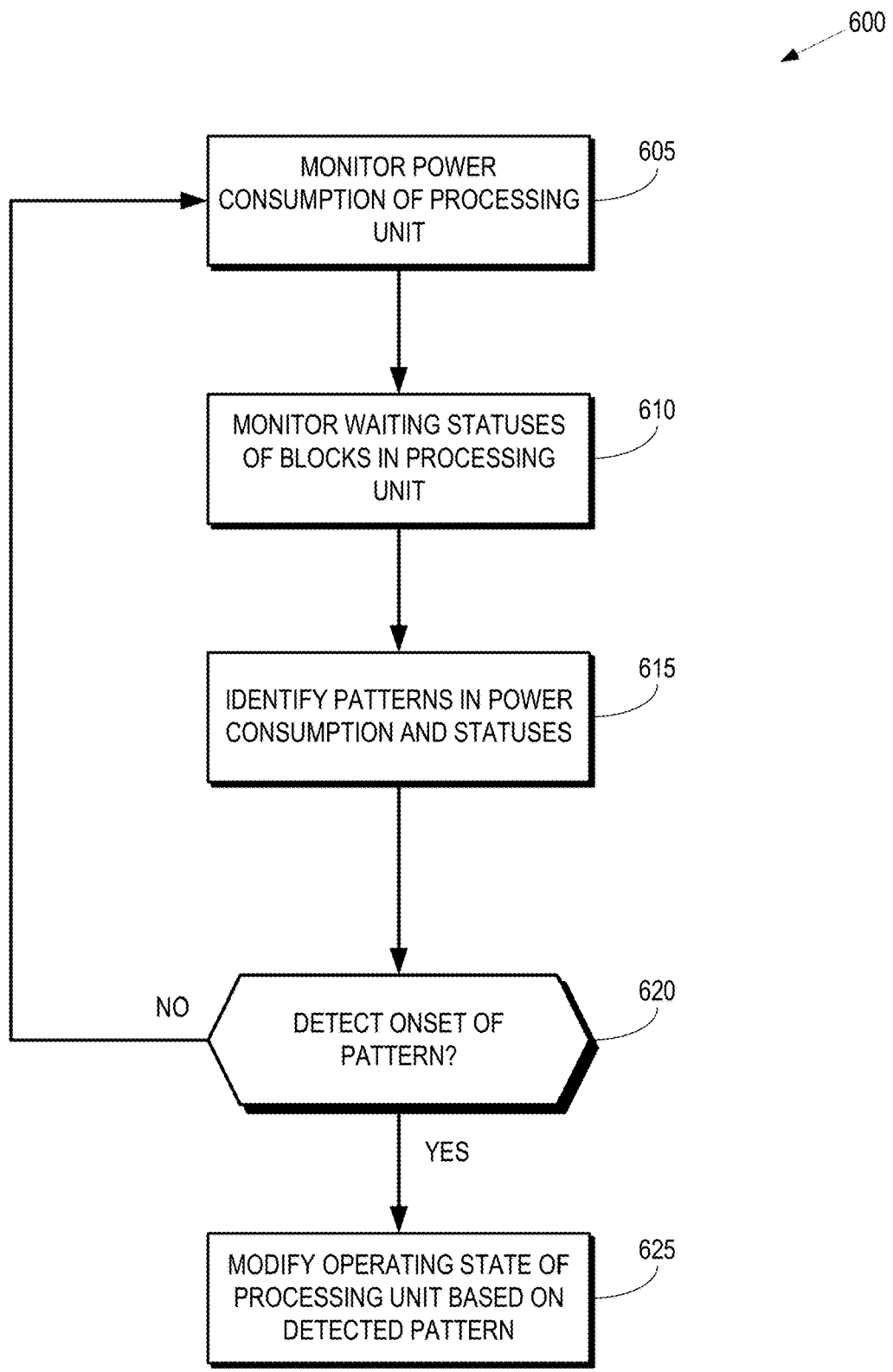
FIG. 6 is a flow diagram of a method of dynamically modifying an operating state of a processing unit based on patterns in power consumption and waiting states of the processing unit according to some embodiments.

FIG. 6 is a flow diagram of a method 600 of dynamically modifying an operating state of a processing unit based on patterns in power consumption and waiting states of the processing unit according to some embodiments. The method 600 is implemented in some embodiments of the processing system 100 shown in FIG. 1 and the GPU 200 shown in FIG. 2. The method 600 is implemented in a controller such as the controller 230 shown in FIG. 2.

At block 605, the controller monitors power consumption of the processing unit. For example, the controller can monitor the power consumption of the processing unit as it cycles between relatively high power consumption states and relatively low power consumption states.

At block 610, the controller monitors waiting statuses of blocks in the processing unit. For example, the controller can monitor percentages of compute units in a GPU that are waiting for other actions to complete.

At block 615, the controller identifies patterns in the power consumption or waiting statuses of the blocks in the processing unit. Some embodiments of the controller implement a machine learning algorithm to identify the patterns based on the monitored power consumption and waiting statuses of the blocks in the processing unit. The patterns can include time intervals in which power consumption is at or near the power limit and the percentage of compute units waiting for other actions to complete is relatively high, time intervals in which power consumption is below the power limit and the percentage of waiting compute units is relatively high, time intervals in which power consumption is at or near the power limit and the percentage of waiting compute units is relatively low, and time intervals in which power consumption is below the power limit and the percentage of waiting compute units is relatively low.

At decision block 620, the controller determines whether a pattern in the power consumption or waiting statuses of the blocks is detected. Some embodiments of the controller detect the pattern based on a neural network that is trained using the machine learning algorithm to identify the patterns. If the controller does not detect onset of a pattern, the method 600 continues to monitor the power consumption and waiting statuses of the blocks of the processing unit. The method 600 also continues to apply the machine learning algorithm to identify patterns in the power consumption and waiting statuses. If the controller detects onset of a pattern, the method 600 flows to block 625.

At block 625, the controller modifies the operating state of the processing unit based on the detected pattern. In some embodiments, the controller modifies the operating state by modifying the clock frequency or voltage supplied to the processing unit. For example, the controller can increase the clock frequency or voltage during time intervals in which the processing unit consumes less than the power limit (as indicated by the pattern) and decrease the clock frequency or voltage during time intervals in which the processing unit consumes power at or near the power limit (as indicated by the pattern). The controller also modifies the clock frequency based on patterns in the waiting status of the processing unit.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing unit comprising:
    a plurality of components configured to execute instructions; and
    a controller configured to determine a power consumption of the processing unit, determine a waiting status of the processing unit based on a plurality of waiting statuses of the plurality of components, and selectively modify an operating state of the processing unit based on the waiting status and the power consumption of the processing unit.

2. The processing unit of claim 1, wherein the controller is configured to determine the waiting status of the processing unit as a percentage of the plurality of components that are waiting for an action to complete.

3. The processing unit of claim 2, wherein the controller is configured to selectively modify the operating state of the processing unit in response to the percentage of the plurality of components that are waiting for an action to complete being above a threshold percentage and the power consumption of the processing unit being below a power limit.

4. The processing unit of claim 3, wherein the controller is configured to selectively modify the operating state of the processing unit by increasing at least one of a clock frequency and a voltage supplied to the processing unit.

5. The processing unit of claim 4, wherein the controller is configured to increase the at least one of the clock frequency and the voltage by a magnitude that is determined based on a difference between the power consumption and the power limit.

6. The processing unit of claim 1, wherein the controller is configured to identify a pattern in the power consumption of the processing unit by monitoring the power consumption of the processing unit over time.

7. The processing unit of claim 6, wherein the controller is configured to identify the pattern comprising a plurality of time intervals during which the power consumption is below a power limit.

8. The processing unit of claim 7, wherein the controller is configured to modify the operating state of the processing unit to increase the power consumption of the processing unit during the plurality of time intervals in the pattern identified by the controller.

9. A method comprising:
   determining a power consumption of a processing unit that includes a plurality of components configured to execute instructions;
   determining a waiting status of the processing unit based on a plurality of waiting statuses of the plurality of components; and
   selectively modifying an operating state of the processing unit based on the waiting status and the power consumption of the processing unit.

10. The method of claim 9, wherein determining the waiting status of the processing unit comprises determining a percentage of the plurality of components that are waiting for an action to complete.

11. The method of claim 10, wherein selectively modifying the operating state of the processing unit comprises selectively modifying the operating state of the processing unit in response to the percentage of the plurality of components that are waiting for an action to complete being above a threshold percentage and the power consumption of the processing unit being below a power limit.

12. The method of claim 11, wherein selectively modifying the operating state of the processing unit comprises increasing at least one of a clock frequency and a voltage supplied to the processing unit.

13. The method of claim 12, wherein selectively modifying the operating state of the processing unit comprises increasing the at least one of the clock frequency and the voltage by a magnitude that is determined based on a difference between the power consumption and the power limit.

14. The method of claim 9, further comprising:
   identifying a pattern in the power consumption of the processing unit by monitoring the power consumption of the processing unit over time.

15. The method of claim 14, wherein identifying the pattern in the power consumption comprises identifying a plurality of time intervals during which the power consumption is below a power limit.

16. The method of claim 15, wherein modifying the operating state of the processing unit comprises increasing the power consumption of the processing unit during the plurality of time intervals in the identified pattern.

17. A processing system comprising:
   a plurality of processing units, wherein each processing unit comprises a plurality of components configured to execute instructions; and
   a controller configured to determine a power consumption of the processing system, determine a waiting status of the processing system based on a plurality of waiting statuses of the plurality of processing units, and selectively modify an operating state of the processing system based on the waiting status and the power consumption of the processing system.

18. The processing system of claim 17, wherein the controller is configured to determine the waiting status of the processing system as a first percentage of the plurality of processing units that are waiting for an action to complete.

19. The processing system of claim 18, wherein the controller is configured to determine the waiting status of the processing system as a first percentage of the plurality of processing units that include a second percentage of components that are waiting for an action to complete, wherein a processing unit is included in the first percentage if the percentage of the components in the processing unit waiting for an action to complete is greater than a threshold percentage.

20. The processing system of claim 17, wherein the controller is configured to modify the operating state of the processing system by a magnitude that is determined based on a difference between the power consumption and a power limit for the processing system.

* * * * *